E. FUCHS.
MOLD FOR PLASTIC MATERIAL.
APPLICATION FILED MAY 5, 1911. RENEWED JUNE 7, 1913.
1,112,284.  Patented Sept. 29, 1914.
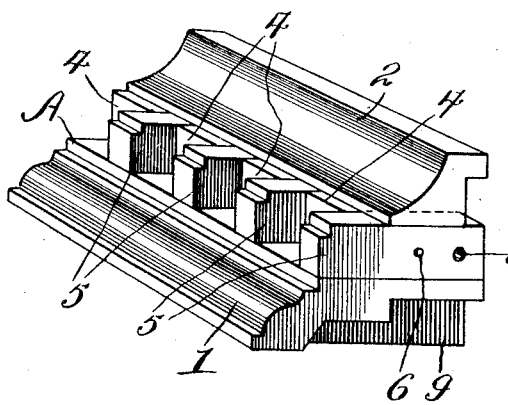
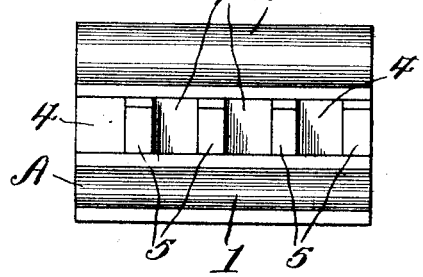
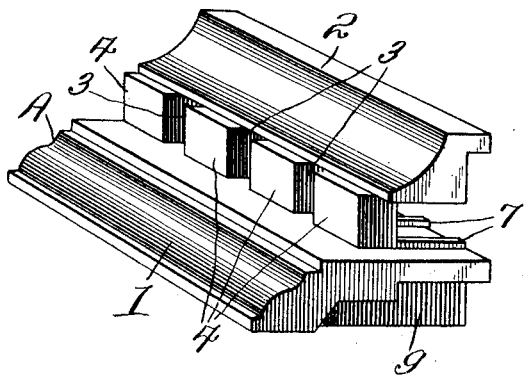
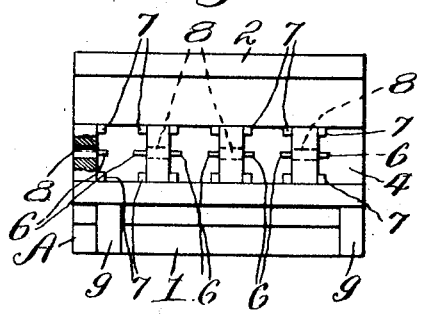
Inventor
Ernesto Fuchs
By Victor J. Evans,
Attorney
Witnesses

UNITED STATES PATENT OFFICE.

ERNESTO FUCHS, OF GUADALAJARA, MEXICO.

MOLD FOR PLASTIC MATERIAL.

1,112,284. Specification of Letters Patent. Patented Sept. 29, 1914.

Application filed May 5, 1911, Serial No. 625,137. Renewed June 7, 1913. Serial No. 772,423.

*To all whom it may concern:*

Be it known that I, ERNESTO FUCHS, a citizen of the United States of America, residing at Guadalajara, Mexico, have invented new and useful Improvements in Molds for Plastic Material, of which the following is a specification.

This invention relates to improvements in molds and has particular application to a mold for manufacturing articles of plastic material such as concrete, cement, plaster and artificial stone and the like.

In carrying out the present invention, it is my purpose to provide a form of mold wherein moldings having deep spaces or voids, such as denticular, mutular or other like orders may be made without the liability of breakage of the dentils or teeth such as is commonly incident to the use of the ordinary mold.

A further object of my invention is the provision of a mold embracing in its construction a face plate contoured or shaped to form the general features of the object to be molded and provided with a number of openings, and spacing blocks removably mounted in the openings and adapted to be withdrawn or removed after the molding process, so that the article being molded will not only have clean sharp surfaces, but breaking or injuring of the sharp angular surfaces or teeth will be obviated.

With the above and other objects in view, the invention consists in the construction, combination and arrangement of parts hereinafter set forth in and falling within the scope of the claims.

In the accompanying drawing: Figure 1 is a perspective view of a mold embodying my invention. Fig. 2 is a similar view of the same with the spacing blocks removed. Fig. 3 is a front view of the mold, and Fig. 4 is a rear view thereof.

Heretofore in the molds of this general character with which I am acquainted, it has been the practice to firmly and rigidly fix the spacing blocks to the face plate at the front thereof, these blocks being tapered for the purpose of avoiding the sticking and breaking of the molding. But, notwithstanding this tapering the molding frequently breaks at the teeth or dentils thereof with a result that the use of such mold is generally unsatisfactory, and numerous moldings are frequently spoiled. By the use of my improvement I avoid such objections, and at the same time obtain a classic denticular or mutular order or the like without altering the shapes or proportions of the classic orders.

In the drawing, I have shown a mold designed to be used in making moldings of the Ionic type, although it will, of course, be understood that the invention is applicable to the manufacture of moldings of other classic orders, such for instance, as the Doric and Corinthian.

Referring now to the accompanying drawing the detail, the letter A designates the face plate of the mold comprising the members 1 and 2 having openings 3 formed therebetween and spaced appropriate distances apart through the medium of the blocks 4. The members 1 and 2 and the blocks 4 of the face plate are preferably integral with one another, although, it will be understood, of course, that the same may be separable, if such is deemed desirable, and this face plate is contoured or shaped to form the general features of the object to be molded. In order to prevent breakage or mutilation of the teeth or dentils of the object being molded, I employ a plurality of spacing blocks which are detachably or removably associated with the face plate so that after the object has been molded, such blocks may be removed to enable the subsequent removal of the face plate without fracturing or otherwise injuring the molding. These spacing blocks are indicated by the numeral 5 and are designed to be inserted in the openings in the main body A and are provided with stops 6 to prevent them from passing any farther than a predetermined distance, the stops in the present instance being shown in the form of pins, such blocks being guided in the rear of the mold by the guide rails 7. These blocks, in the present instance, are further provided with sockets or bores 8 through which may be inserted a rod or other pole for the purpose of removing the blocks when desired. If deemed necessary or found desirable, the main body of the mold may be provided, as shown in the drawing, with ribs 9 which serve to maintain the mold in a true position.

The above is a description of my improved mold, and the manner of employing the same is substantially as follows: The face plate of the mold with the inserted spacing blocks is placed on the pallet or platform customarily used in the plastic art and the mold box or flask is then placed in position around the mold and the plastic material rammed into the mold box filling all the spaces around and over the mold. When the mass has been properly tamped, the box containing the face plate and the plastic material is turned upside down and the mold box is then opened, leaving the mold or face plate resting tightly on the molding material. Now, holding the face plate firmly against the molded mass, the space blocks are pulled out one at a time from the rear by inserting a hook or other tool in the sockets or holes 8 and pulling toward the rear. After all of the space blocks 5 are removed, the face plate is taken off the formed mold, the latter presenting equal sharp, and positive surfaces.

It will be noted that I have provided an exceedingly simple, yet efficient and effective form of mold, which may be adapted for use in molding any desired ornamentation dependent, of course, on the contour of the face plate and wherein the space blocks may be protruded through and withdrawn within the openings in the face plate to produce a succession of regular depressions, thus leaving a series of regularly recurring projections of an ornamental character in the molded object to form the dentils or teeth of the order.

I wish it to be understood that I do not limit my invention in its useful application to the precise form which for the purpose of illustration is herein delineated, as modification and variation may be made without departing from the spirit of the invention or exceeding the scope of the appended claims.

I claim:

1. In a mold for forming plastic material, a face plate contoured to form the general features of the object and composed of two sections spaced apart in parallel relation, blocks interposed between said sections and forming a series of openings spaced apart and extending from the rear to the front of the plate, spacing blocks slidingly fitted in and adapted to be protruded through and withdrawn within said openings, said blocks being adapted to produce a succession of regular depressions, leaving thereby a series of regularly recurring projections of an ornamental character in the molded object.

2. In a mold for forming plastic material, a face plate contoured to form the general features of the object and composed of two sections spaced apart in parallel relation, blocks interposed between said sections and forming a series of openings spaced apart and extending from the rear to the front of the plate, spacing blocks slidingly fitted in and adapted to be protruded through and withdrawn within said openings, said blocks being adapted to produce a succession of regular depressions, leaving thereby a series of regularly recurring projections of an ornamental character in the molded object, and means for guiding said blocks when withdrawn from said openings.

3. In a mold for forming plastic material, a face plate contoured to form the general features of the object and composed of two sections spaced apart in parallel relation, blocks interposed between said sections and forming a series of openings spaced apart and extending from the rear to the front of the plate, spacing blocks slidingly fitted in and adapted to be protruded through and withdrawn within said openings, said blocks being adapted to produce a succession of regular depressions, leaving thereby a series of regularly recurring projections of an ornamental character in the molded object, means for guiding said blocks when withdrawn from said openings, and means for limiting the movement of said blocks when protruded through said openings.

In testimony whereof I affix my signature in presence of two witnesses.

ERNESTO FUCHS.

Witnesses:
  O. NEUMANN,
  AUDORY ARPY.

---

Copies of this patent may be obtained for five cents each, by addressing the "Commissioner of Patents, Washington, D. C."